United States Patent
Chau et al.

(10) Patent No.: US 7,223,894 B2
(45) Date of Patent: *May 29, 2007

(54) PROCESS FOR TOTAL HYDROGENATION USING A CATALYTIC REACTOR WITH A HYDROGEN-SELECTIVE MEMBRANE

(75) Inventors: Christope Chau, Rueil Malmaison (FR); Denis Uzio, Marly le Roi (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 345 days.

This patent is subject to a terminal disclaimer.

(21) Appl. No.: 10/768,176

(22) Filed: Feb. 2, 2004

(65) Prior Publication Data
US 2004/0260130 A1 Dec. 23, 2004

(30) Foreign Application Priority Data
Jan. 31, 2003 (FR) .................................. 03 01092

(51) Int. Cl.
*C07C 5/02* (2006.01)
(52) U.S. Cl. ........................ 585/264; 585/265; 585/275
(58) Field of Classification Search ................ 585/264, 585/265, 275
See application file for complete search history.

(56) References Cited

U.S. PATENT DOCUMENTS 4,179,470 A   12/1979 Mischenko et al.
4,827,071 A   5/1989 Hazbun
5,583,240 A   12/1996 Asher et al.
5,931,987 A   8/1999 Buxbaum

FOREIGN PATENT DOCUMENTS

| | | |
|---|---|---|
| DE | 199 18 486 | 10/2000 |
| FR | 2 277 059 | 1/1976 |
| GB | 2 187 759 | 9/1987 |
| WO | WO 00/32512 | * 6/2000 |
| WO | 02 092203 | 11/2002 |

* cited by examiner

*Primary Examiner*—Thuan Dinh Dang
(74) *Attorney, Agent, or Firm*—Millen, White, Zelano & Branigan, P.C.

(57) ABSTRACT

A process for total hydrogenation of polyunsaturated compounds that have n nonsaturations that are contained in a hydrocarbon feedstock in the presence of a catalytic reactor with a hydrogen-selective membrane is described. This process comprises the introduction of said feedstock that is co-mixed with hydrogen into a reaction zone of said reactor, the contact of hydrogen with the face that is upstream from said membrane, which is inorganic and porous, then the catalytic reaction of said feedstock with hydrogen that has selectively traversed the membrane.

13 Claims, No Drawings

PROCESS FOR TOTAL HYDROGENATION USING A CATALYTIC REACTOR WITH A HYDROGEN-SELECTIVE MEMBRANE

CROSS REFERENCE TO RELATED APPLICATION

This application relates to Applicants' concurrently filed application Ser. No. 10/768,705, entitled "PROCESS FOR SELECTIVE HYDROGENATION USING A CATALYTIC REACTOR WITH A HYDROGEN-SELECTIVE MEMBRANE".

This invention relates to the field of total hydrogenation of polyunsaturated hydrocarbon molecules. More specifically, it has as its object a process for total hydrogenation of polyunsaturated hydrocarbon molecules that use a catalytic reactor with a hydrogen-selective membrane, obtained by the combination of a porous inorganic membrane and a total hydrogenation catalyst. The porous inorganic membrane is hydrogen-selective, and the catalyst makes possible the conversion by total hydrogenation of polyunsaturated hydrocarbon molecules and in particular polyolefins, aromatic compounds, alkenylaromatic compounds, acetylene compounds, polyacetylene compounds, polyketones and polyaldehydes. The combination of an inorganic porous membrane, permeable and hydrogen-selective, and a total hydrogenation catalyst makes it possible to monitor, within the catalytic bed, the concentration of hydrogen, which is reflected by very high total hydrogenation product yields for high hydrocarbon molecule conversion rates.

The reactions for total hydrogenation of polyunsaturated hydrocarbon molecules exhibit a strong advantage in particular in the fields of refining and petrochemistry, fine chemistry, and the farm-produce industry. These reactions are exothermic, and the monitoring of the reaction is a key component of the industrial process and the associated technology. In the presence of hydrogen, the exothermny of the reaction as well as the local overconcentrations of hydrogen make it difficult to monitor the reaction and subject the catalyst to operating conditions that limit its stability and its service life, which presents a direct and negative influence on the industrial productivity and the product yields. It is then often necessary to operate with a low conversion of hydrocarbons, to dilute the feedstock, and to impose a short dwell time of the hydrocarbons in the catalytic bed. It is also necessary to regenerate the catalyst or to replace it, which produces additional costs in operating terms such as investments. The operations are consequently complex and involve recirculation loops of the reaction effluents to increase the conversion without degrading the stability of the catalyst by successive passages of unconverted hydrocarbons upon contact of the catalyst. The existing total hydrogenation processes generally use a catalytic reactor in which the hydrogen that is necessary to the reaction and the hydrocarbon feedstock that is to be hydrogenated are introduced either simultaneously or separately. The simultaneous introduction is made most often without monitoring the concentration of hydrogen at the inlet of the reactor and without preliminary separation of hydrogen, which implies that excess hydrogen circulates in the total hydrogenation catalytic reactor (local overconcentrations of hydrogen), leading to risks of losing control of the reaction and making more complex the monitoring of the reaction, affecting the yield and the industrial productivity of the units and finally being able to limit the stability of the catalyst. Furthermore, the increased consumption of hydrogen in these processes is unfavorable, taking into account the increasing demands for hydrogen, and its associated cost, in the industry in particular of refining, petrochemistry and chemistry. The introduction of hydrogen and the hydrocarbon feedstock that is to be hydrogenated in two separate flows, at the inlet of the reactor, offers the advantage of being able to use a hydrogen source that is contained, for example, in an effluent of a refinery unit and that has been separated upstream from the hydrogenation catalytic reactor so as to monitor the concentration of hydrogen at the inlet of the hydrogenation reactor. However, the complete separation upstream generally requires cryogenic-type units, very detrimental in terms of investment. It is known in the prior art of processes that make it possible to adjust the hydrogen to hydrocarbon ratio at the inlet of the hydrogenation reactor. However, the monitoring of the ratio of hydrogen to hydrocarbons only at the inlet of the reactor does not make it possible to obtain optimal performance levels in terms of yield, exothermy, heat exchanges and productivity of the process. Actually, the yield of total hydrogenation products can be greatly degraded when the conversion rates of hydrocarbons increase. In addition, these processes are highly hydrogen-consumption-intensive, and the excess hydrogen that is fed into the catalytic reactor should be separated from products at the end of the catalytic reaction, which involves additional separating costs with that of the associated equipment.

Also, this invention proposes providing a total hydrogenation process that remedies the problems encountered in the previous processes. In particular, the total hydrogenation process according to this invention makes it possible to obtain very high conversion rates of hydrocarbons by catalytic hydrogenation, with optimum yields of total hydrogenation products, by limiting the consumption of hydrogen to the amount that is necessary for hydrogenation, by limiting the exothermy that is released during the catalytic reaction, and by optimizing the service life of the catalyst.

The object of this invention is a total hydrogenation process of polyunsaturated compounds with n nonsaturations that are contained in a hydrocarbon feedstock by means of a catalytic reactor with a hydrogen-selective membrane, comprising:

a) the introduction of said feedstock co-mixed with hydrogen in a ratio such that {$H_2$/polyunsaturated compounds) is less than 0.8 n, whereby n is greater than or equal to 2, in at least one reaction zone of said reactor, b) the contact of at least a portion of hydrogen that is necessary to the hydrogenation reaction with the face that is upstream from said membrane, which is inorganic and porous, and c) the catalytic reaction in said reaction zone of the feedstock that is introduced there in stage a) with at least a portion of the hydrogen that selectively passes through said membrane.

Said membrane catalytic reactor combines at least one catalyst in divided form, for example in the form of balls, grains or extrudates, with at least one inorganic membrane, porous, catalytically inactive and hydrogen-selective. The membrane is inactive on the catalytic plane and is lacking in any type of catalytic element within its porous network. Said membrane allows hydrogen to pass selectively from its upstream face to its downstream face, preferably by a selective diffusion mechanism. The hydrogen that has selectively passed through the membrane and that is thus found in the downstream space of the membrane reacts in the reaction zone of the reactor with the hydrocarbon feedstock that contains unsaturated compounds, whereby said feedstock was previously co-mixed with hydrogen.

In particular, the membrane exhibits the advantage of being able to distribute the hydrogen selectively at the catalytic bed, by thus limiting the phenomena of losing control, the local overconcentrations of hydrogen, which have a negative effect on the yields of the products of the selective hydrogenation reaction, induce the formation of undesirable by-products, degrade the yields and the industrial productivities, and can alter the stability and the service life of the catalyst.

The reactor preferably comes in tubular form, but any geometry is compatible with the formed combination of catalyst and membrane. When the reactor comes in tubular form, the membrane can be either surrounded by catalyst or can be found around the catalyst. Another preferred form of the reactor is the one where the reactor comes in flat form. The membrane then generally forms a first flat layer, and the catalytic bed forms a juxtaposed second flat layer. The combination of the membrane and the catalyst can exist in several forms according to the geometries of the membrane: the catalyst in divided form can be placed in the inside space, or outside space that is delimited by the tubular membrane; it can also be dispersed into a bundle of hollow-fiber-type membranes. Regardless of the geometry of the membrane, the total hydrogenation catalyst is preferably placed in the space downstream from the membrane.

According to the process of the invention, the polyunsaturated compounds that are to be hydrogenated contain n nonsaturations, whereby n is greater than or equal to 2, preferably between 2 and 20, more preferably between 2 and 15, and even more preferably between 2 and 10. Within the meaning of this invention, nonsaturation is defined as the number of double bonds to hydrogenate for a total hydrogenation. Thus, for the total hydrogenation of diolefin or monoacetylene compounds, n is equal to 2. For the total hydrogenation of aromatic compounds that contain only a single benzene ring, n is equal to 3. According to stage a) of the process of the invention, the hydrocarbon feedstock that contains the polyunsaturated compounds with n nonsaturations is co-mixed with hydrogen in a ratio such that ($H_2$/polyunsaturated compounds) is less than 0.8n, preferably less than 0.6n, and very preferably less than 0.4n. A low ratio of $H_2$/polyunsaturated compounds that are to be hydrogenated is adequate for obtaining a high yield of total hydrogenation product while preserving an optimal conversion of polyunsaturated compounds by monitoring the exothermy of the catalytic process and the stability of the catalyst. Thus, for example, when the polyunsaturated compounds that are to be hydrogenated according to the process of the invention are diolefins or monoacetylene compounds, the $H_2$/diolefins or $H_2$/monoacetylene compounds ratio is less than 1.6, preferably it is less than 1.2, and more preferably it is less than 0.8. When the polyunsaturated compounds that are to be hydrogenated according to the process of the invention are aromatic compounds that contain a single benzene cycle, the $H_2$/aromatic compound ratio is less than 2.4, preferably less than 1.8, and more preferably less than 1.2.

According to the invention, at least a portion of the hydrogen that is necessary to the total hydrogenation reaction is brought into direct contact with the face that is upstream from said membrane and then selectively passes through the membrane via the porous network of said membrane to react in the catalytic bed (space that is downstream from the membrane). Preferably, at least 20% of the hydrogen that is necessary for the total hydrogenation reaction is brought into direct contact with the face that is upstream from said membrane. Preferably, at least 40%, and more preferably at least 60%, but at most 99%, of the hydrogen that is necessary for the total hydrogenation reaction is brought into direct contact with the face that is upstream from said membrane. Advantageously, the hydrocarbon feedstock that contains the polyunsaturated compounds that are to be hydrogenated and that is introduced into the reaction zone of the catalytic reactor according to stage a) of the process according to the invention contains at least 1% and at most 80% of the hydrogen that is necessary for the hydrogenation reaction, preferably it contains at most 60% thereof, and even more preferably, it contains at most 40% thereof. Said hydrocarbon feedstock that is co-mixed with hydrogen is introduced into the reaction zone of the catalytic reactor with a hydrogen-selective membrane, i.e., with direct contact of the catalyst that is included in said reactor and that is present in the space that is downstream from the membrane.

In accordance with the process according to the invention, the membrane that is included within the membrane catalytic reactor plays the role of a selective hydrogen distributor at the catalytic bed. The selective distribution of the hydrogen, from the upstream face to the downstream face, via the porous membrane, makes it possible to monitor the supply of hydrogen within the catalytic bed, which limits the exothermy of the reaction, the loss of control and the secondary reactions, such as, for example, isomerization, condensation, cracking or degradation. This supply of hydrogen that is controlled in terms of concentration and is regular over time in a steady state operation within the catalytic bed thus makes it possible to prevent local overconcentrations of hydrogen within the catalytic bed, which is reflected by high hydrocarbon conversions and very high selectivities for the total hydrogenation products by controlled distribution of hydrogen through the membrane and makes it possible to keep the catalyst active over significant periods.

The hydrogen, which is usually used on the industrial scale as a reagent for hydrogenation, allows a high purity (greater than 90 mol % and more generally greater than 95%). In the process according to the invention, it is advantageous from an economical and technical viewpoint to use a hydrogen source with a lower purity and a lower cost for the contact of the hydrogen with the face that is upstream from the membrane. The membrane that is included in the membrane catalytic reactor being hydrogen-selective therefore allows only hydrogen to pass while the possible impurities that are also present in the outside source do not pass through the membrane. Consequently, the purity of the hydrogen that is present in the outside source is less critical than in the processes of the prior art.

Thus, the portion of hydrogen that is necessary to the total hydrogenation reaction and direct contact of the face that is upstream from said porous inorganic membrane can be obtained from an outside source that contains hydrogen of high purity, i.e., higher than 75 mol %, preferably higher than 90 mol %, and very preferably higher than 95 mol %. Said hydrogen portion that is necessary to the total hydrogenation reaction and direct contact of the face that is upstream from said porous inorganic membrane can also be obtained from an outside source that is advantageously a gaseous effluent that contains impure hydrogen of the least purity, i.e., generally higher than 25 mol %, preferably higher than 50 mol %, and very preferably higher than 65 mol %. The membrane thus makes possible the separation of hydrogen from the gaseous mixture then the selective distribution by partial or total transfer of this hydrogen, purified by passage through the membrane, to the catalytic bed. This implementation that consists in using an outside source that contains impure hydrogen thus makes it possible to recover the hydrogen that is obtained from a unit of refining or petrochemistry, purging gas, such as, for example, the one that is obtained from a unit for catalytic reforming, catalytic cracking, partial oxidation of hydrocarbons or reforming of methane and natural gas, or more generally of any unit that, in the refinery or the petrochemical complex, produces excess hydrogen or a recycling gas that contains hydrogen, or else that is obtained from liquid mixtures or vapors that contain hydrogen. For example, the membrane makes it possible to extract the hydrogen selectively from an effluent that contains hydrocarbons and impurities such as CO, COS and $H_2S$. These molecules, CO and $H_2S$ in particular, would run the risk, without the hydrogen-selective membrane that is inorganic and porous, of altering the activity of the catalyst that is used for hydrogenation. The integrated operation of separation by membrane makes it possible to avoid the presence of such compounds in the catalytic bed, and the outside hydrogen source can thus contain hydrocarbons and impurities. In accordance with the process according to the invention, these impurities, not passing through the hydrogen-selective membrane, consequently do not have the harmful effect of deactivation on the catalyst in the reaction zone where circulate the hydrocarbon feedstock that is to be converted and the hydrogen that has selectively passed through the membrane by selective diffusion.

Any hydrogen-selective, porous, inorganic membrane that is known in the prior art is suitable for the implementation of the process according to the invention. Among these membranes, it is possible to cite, without being exhaustive, the zeolite membranes, the alumino-silicate membranes, the silica membranes, the alumina membranes, the carbon membranes and the composite membranes. The composite membranes are obtained with different inorganic phases, such as, for example, the zeolite membranes that are supported on alumina, on glass, on silica, on carbon or on metal. The zeolite membranes that are modified in particular with transition elements, such as titanium, boron, germanium or gallium, are also advantageously used for the implementation of the process according to the invention. Among the zeolite membranes, those whose zeolite is of structural type MFI, LTA, SOD, CHA, ANA, ERI, TON, AEL, EUO, MEL, MTT and FAU are preferred. When the membrane is supported, any type of inorganic substrate can be used, such as, for example, silica, alumina, glass, carbon, zirconia, titanium oxide, clay, glass, and porous metals, or a combination of these materials. The substrates and the membranes can have a tubular, flat, or spiral geometry or else be in the form of hollow fibers or multi-channel monoliths. Other geometries can also be suitable. The geometries of substrates and membranes that are compatible with an industrial use of these membranes are advantageously used. In particular, the substrates and the spiral or tubular membranes or the membranes that are in the form of hollow fibers make it possible to operate modules and compact units (high ratio of membrane surface area to the equipment volume).

Preferably, the porous, inorganic membrane that is present in the membrane catalytic reactor is a microporous-type or nanoporous-type membrane. Microporous membrane is defined as any membrane whose pore size is strictly less than 2 nm (nanometers), according to the IUPAC classification. Nanoporous membrane is defined as any membrane whose pore size is on the order of a nanometer, i.e., preferably included between 2 and 10 mn. The mesoporous membranes can also advantageously be used, in particular when the pore size is less than 50 nm and preferably between 10 and 20 nm.

The porosity of said $H_2$-selective inorganic membrane can be either uniform or gradual. The porosity of the membrane is called uniform when the pore size is homogenous in the entire porous network of the membrane. The pore size distribution is then narrow. The porosity of the membrane is called gradual when the pore size is not homogeneous in the entire porous network of the membrane. The difference in pore size in the porous network that is still called a porosity gradient is advantageous for monitoring in an optimal way the distribution of hydrogen within the catalytic bed. The porosity gradient can vary, for example, in an axial, radial or longitudinal manner according to the geometry of the membrane. In the case where the porosity of the membrane is gradual, it is preferred that the size of the pores of the membrane be larger on the membrane fraction that is located close to the inlet of the catalytic reactor where the hydrocarbon feedstock that contains the polyunsaturated compounds that are to be hydrogenated is introduced than on the membrane fraction that is removed from the inlet of the reactor. For example, on the membrane fraction that is combined with the first third of the volume of the membrane catalytic reactor, the pore size is between 10 and 20 nm, preferably between 10 and 15 nm; on the membrane fraction that is combined with the second third of the membrane catalytic reactor volume, the pore size is between 2 and 5 nm, preferably between 2 and 3 nm; and on the membrane fraction that is combined with the third third of the membrane catalytic reactor volume, the pore size is less than 1 nm, preferably less than 0.8 nm. For example, an inorganic membrane of controlled porosity of Membralox® type, marketed by Vivendi (tubular membrane with a longitudinal porosity gradient), can advantageously be used in the membrane catalytic reactor. Another example relates to a zeolite-type membrane that is supported on mesoporous alumina: the substrate can consist over its entire length of 10 nm porous alumina, covered by alumina of the gamma-allotropic variety with a pore size of 5 nm on the membrane fraction that is combined with the second third of the membrane catalytic reactor volume and covered by MFI zeolite with a pore size of 0.55 nm that is obtained by hydrothermal synthesis on the membrane fraction that is combined with the third third of the volume of the membrane catalytic reactor.

Said inorganic membrane, hydrogen-selective and with a uniform or gradual porosity, exhibits satisfactory properties in terms of chemical and thermal stability. Thus, the membrane is stable in the presence of a hydrocarbon feedstock that contains polyunsaturated compounds such as polyolefins or aromatic compounds.

Furthermore, the thermal stability of said inorganic membrane makes it possible to regenerate the catalyst that is combined with the membrane in the membrane catalytic reactor that is thus formed, whereby said regeneration takes place generally at temperatures that are, for example, close to, and even higher than, 200° C.

Any total hydrogenation catalyst that is known to one skilled in the art can be used in the membrane catalytic reactor for the total hydrogenation reaction. Thus, any supported catalyst with a base of at least one metal of group VIII, and more particularly a noble metal of group VIII, can be used in the catalytic bed of the reactor. The multimetallic catalytic formulations that at the same time contain at least one metal of group VIII and at least one additional metal, for example selected from among tin, germanium, silver and gold, are also advantageously used. When the process according to the invention is used for the hydrogenation of aromatic compounds, the preferred metals of group VIII are platinum and nickel. In the case of hydrogenation of polyolefin compounds, such as dienes, and acetylene compounds or polyacetylene compounds, the preferred metal will be palladium. The substrate on which the metal (or metals) is (or are) deposited preferably has an inorganic nature. The substrate of the catalyst for the implementation of the process according to the invention generally comprises a refractory oxide that is selected from among the oxides of metals of groups II, III and IV of the periodic table, such as, for example, the oxides of magnesium, aluminum, silicon, titanium, zirconium and thorium, by themselves or mixed with one another or mixed with other oxides of metals from the periodic table. As a catalytic substrate, it is also possible to use carbon, zeolites, for example of the structural type of FAU (X or Y zeolite), MOR (mordenite zeolite), MFI (ZSM-5 zeolite), MAZ (ZSM-4 or Omega) as well as mixtures of oxides of metals of groups II, III and/or IV with a zeolitic material. The catalyst comes in divided form, preferably in the form of balls or extrudates. Said catalyst is in direct contact with the hydrocarbon feedstock that contains polyunsaturated compounds as well as with hydrogen that has selectively passed through the membrane and is necessary to the hydrogenation reaction.

The catalyst may be activated either in situ, i.e., in the reaction section of the membrane catalytic reactor, or ex situ, prior to the loading of the catalyst. The activation stage consists of a stage for reducing metallic oxides of the catalyst, for example in pure hydrogen or in dilute hydrogen. The catalyst can be regenerated either in situ, i.e., directly in the membrane catalytic reactor, or ex situ, which then makes it necessary to withdraw the catalyst from the reactor and to reintroduce it after regeneration. The thermal stability of said inorganic membrane actually makes it possible to regenerate in situ the catalyst that is combined with the membrane in the catalytic reactor. The regeneration can be done in all of the cases according to any method that is known to one skilled in the art.

According to a first mode of configuration of the catalytic reactor with a hydrogen-selective membrane, the distribution of the catalyst that is present in the reaction zone of said reactor is homogeneous.

According to a second mode of configuration of the catalytic reactor with a hydrogen-selective membrane, the distribution of the catalyst that is present in the reaction zone of said reactor is gradual so as to monitor the conversion of polyunsaturated compounds based on local concentrations of hydrogen and these polyunsaturated compounds. The distribution gradient of the catalyst can vary, for example, axially, longitudinally or radially according to the geometry of the reactor and the related membrane. A preferred configuration will produce a larger amount of hydrogenation catalyst at the inlet of the reaction zone than at the outlet. For example, 30 to 70% by mass, and preferably 40 to 60% by mass of the catalyst, is found in the reaction zone that corresponds to the first third of the membrane catalytic reactor volume, 20 to 45%, and preferably 25 to 35% by mass of the catalyst is found in the reaction zone that corresponds to the second third of the membrane catalytic reactor volume, and 5 to 30%, and preferably 10 to 20%, by mass of catalyst is found in the reaction zone that corresponds to the third third of the membrane catalytic reactor volume.

The polyunsaturated compounds that can be hydrogenated according to the process of the invention are selected from the group that consists of dienes, polyolefins, acetylene compounds, polyacetylene compounds, aromatic compounds, polyaromatic compounds and aromatic compounds that have unsaturated hydrocarbon chains, for example the aromatic alkenyls, the polyketones and polyaldehydes that comprise several unsaturated groups of the same nature or of a different unsaturated nature, for example aromatic ketones. The polyolefins can be conjugated or not conjugated.

In the process according to the invention, the porous inorganic membrane, with a uniform pore size or with a porosity gradient, exhibits satisfactory properties in terms of chemical and thermal stability, compared to dense, metallic or organic membranes, which are sensitive to, for example, the presence of polyolefins or aromatic compounds. The stability of the porous inorganic membrane thus makes it possible to operate the membrane reactor within a wide range of operating conditions (temperature, pressure, in particular) and with feedstocks whose compositions may vary, in particular with polyolefins, acetylene compounds, aromatic compounds, and impurities such as hydrogen sulfide, sulfur oxides, nitrogen oxides, and carbon oxides.

The operating conditions for the implementation of the process according to the invention are generally as follows:

Feed pressure of the hydrocarbon feedstock: from 0.1 to 10 MPa, preferably from 0.2 to 5.0 MPa, and more preferably from 0.7 to 4.0 MPa;

Hydrogen pressure (upstream from the membrane): from 0.1 to 5 MPa, more preferably from 0.2 to 2 MPa, and even more preferably from 0.2 to 1.5 MPa;

Temperature: from 5 to 300° C., preferably from 10 to 200° C., and more preferably from 15–150° C.;

Hourly volumetric flow rate (VVH) of the feedstock that contains the compound(s) to be hydrogenated: from 0.05 to 50 $h^{-1}$, preferably from 1 to 20 $h^{-1}$, and more preferably from 2 to 10 $h^{-1}$ relative to the catalyst that is employed in the hydrogenation reaction.

These conditions are compatible with the integrated stages for separation of hydrogen, selective transfer of hydrogen, and catalytic hydrogenation that is coupled in the membrane catalytic reactor, and they promote the synergy of the separation/reaction coupling by optimizing the recovery and the distribution of hydrogen.

The following examples illustrate the invention and should in no case be considered as limiting relative to the scope of the invention.

EXAMPLE 1

Hydrogenation of Aromatic Compounds

In this example, a catalytic reactor with a hydrogen-selective membrane is obtained by combination of (a) an MFI-zeolite-type porous inorganic membrane, supported on a porous alumina of tubular geometry, and (b) a total hydrogenation catalyst. The membrane is prepared by hydrothermal crystallization of a solution that contains silicon (Aerosil 380, Degussa), tetrapropyl ammonium hydroxide TPAOH (Fluka) and water (solution with a stoichiometry of 1 $SiO_2$, 0.4 TPAOH, 22.3 $H_2O$), subjected for 72 hours to a treatment at 175° C. in the presence of an alumina substrate of an alpha allotropic variety (PaII) and with tubular geometry. The membrane that is obtained is calcined in air at 450° C. so as to degrade the organic compound TPAOH. The characterization by x-ray diffraction and the gas permeation ($nC_4H_{10}/iC_4H_{10}$) confirms that the membrane is of MFI-zeolite-type (pore diameter of about 0.55 nm) supported on alumina. The catalyst that is used contains 20% Ni in oxide form that is supported on a transition alumina of 130 $m^2/g$ of specific surface area. Balls of this catalyst (3.0 g) are placed in the inside space (downstream) of the MFI zeolite membrane, in tubular form. Said catalyst is activated in advance in situ upon contact with a flow of pure hydrogen at a temperature of 400° C. for 4 hours, with a temperature increase of 5° C./mn and a flow rate of pure hydrogen of 1 l/h per gram of catalyst, so as to reduce the nickel oxides of active metal in catalysis.

The reactor that is thus formed is used in a reaction for total hydrogenation of aromatic compounds that are contained in a hydrocarbon feedstock, obtained from catalytic reforming. Said feedstock consists of 13.5% aromatic compounds and 86.5% paraffins and naphthenes. This aromatic fraction consists of: 0.4% benzene, 3.2% C7 aromatic compounds, 9.2% C8–C9 aromatic compounds, and 0.7% aromatic compounds that have more than 10 carbon atoms (percentages by mass).

In the inside space (downstream) of the membrane, the feed, which consists of the reforming feedstock and hydrogen in a ratio such that {H$_2$/aromatic compounds} is equal to 1.65, is brought into contact with the catalyst that is kept at a temperature of 200° C. under a pressure of 0.3 MPa. The hourly volumetric flow rate is equal to 10 h$^{-1}$ (in m$^3$/h of hydrocarbons per m$^3$ of catalyst). In the outside space (upstream) of the membrane, hydrogen is introduced upon contact with the face that is upstream from the selective MFI membrane that is inorganic and porous (3 m$^3$/h/m$^3$ of catalyst, 1.2 MPa, 100% H$_2$).

The membrane catalytic reactor that is thus obtained is evaluated continuously over periods that are longer than 500 hours (age of the catalyst).

Under these conditions, the conversion of aromatic compounds reaches 99%, and the total yield of hydrogenation products is equal to 98.9%. The process according to the invention thus makes it possible to obtain very high conversions by limiting the exothermy of the reaction by monitoring the reaction with a controlled input of hydrogen.

EXAMPLE 4

Acetylene Hydrogenation

The membrane catalytic reactor comprises an alumina membrane of an alpha allotropic variety with a pore size of 10 nm (PaII) and tubular geometry, and a Pd/Ag-type catalyst that is supported on an alumina with a low specific surface area. The catalyst is reduced under a stream of pure hydrogen, with a rise of 1° C./mn, then kept at 200° C. for 6 hours, which makes possible the reduction of metal oxides into metal with catalytic properties. Said catalyst (3.2 g, Axens) is introduced into the inside space (downstream) of the membrane. The catalyst and the associated membrane, forming the membrane catalytic reactor, are kept at 30° C. Upon contact with the catalyst, the feed that consists of a mixture of acetylene and hydrogen, in an H$_2$/acetylene molar ratio that is equal to 1 (16.3 ml/mn), is introduced into the inside space (downstream) of the membrane. The volumetric flow rate by weight (in English: Weight Hourly Space Velocity WHSV) is equal to 0.1 h$^{-1}$ (in gram of acetylene per gram of catalyst). In the outside space (upstream) of the membrane, hydrogen is introduced upon contact with the face that is upstream from the inorganic and porous selective alumina membrane (28 ml/mn, 0.1 MPa, 100% H$_2$). Under these conditions, the conversion of the acetylene reaches 98.3%, and the ethane yield is 98.2%. The exothermy of the reaction, the loss of control, and the deactivation of the catalyst are limited. The catalyst can thus be operated more than 500 hours continuously.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No. 03/01.092, filed Jan. 31, 2003 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for total hydrogenation of polyunsaturated compounds that have n nonsaturations contained in a hydrocarbon feedstock, said process being conducted in a catalytic reactor comprising an inorganic catalytically inactive hydrogen-selective membrane having an upstream face and a downstream face, and downstream of said downstream face at least one reaction zone containing a bed particulate catalyst, said process comprising:
    a) co-mixing said feedstock with hydrogen in a concentration of at least 1% of the hydrogen necessary for total hydrogenation and in a mol ratio such that H$_2$/polyunsaturated compounds is less than 0.8n, wherein n is greater than or equal to 2, and introducing the resultant mixture directly into said at least one reaction zone of said reactor,
    b) contacting at least a portion of a gas containing additional hydrogen necessary to the hydrogenation reaction with the upstream face of said membrane and selectively passing at least a portion of said hydrogen through said membrane into the reaction zone, and
    c) conducting the catalytic reaction in said reaction zone of the feedstock introduced in stage a) with at least a portion of the hydrogen that selectively traverses said membrane, whereby the hydrogen co-mixed with the feedstock and the hydrogen selectively passed through the membrane jointly contribute to the total hydrogenation.

2. A process according to claim 1, in which said mol ratio H$_2$/polyunsaturated compounds is less than 0.6n, whereby n is greater than or equal to 2.

3. A process according to claim 1, in which said hydrogen portion that is brought into direct contact with the face that is upstream from the membrane is obtained from an outside source that contains hydrogen with a purity that is higher than 25 mol %.

4. A process according to claim 3, in which said outside source contains hydrocarbons and impurities.

5. A process according to claim 1, in which said hydrogen-selective membrane is selected from among zeolite membranes, the alumino-silicate membranes, silica membranes, alumina membranes, carbon membranes and composite membranes.

6. A process according to claim 1, in which said hydrogen-selective membrane exhibits a uniform porosity.

7. A process according to claim 1, in which said hydrogen-selective membrane exhibits a gradual porosity.

8. A process according to claim 1, in which said polyunsaturated compounds are selected from among dienes, polyolefins, acetylene compounds, polyacetylene compounds, aromatic compounds, polyaromatic compounds, and aromatic compounds that have unsaturated hydrocarbon chains, polyketones and polyaldehydes that comprise several unsaturated groups.

9. A process according to claim 1, in which the feed pressure of the feedstock is between 0.1 and 10 MPa; the hydrogen pressure upstream from the membrane is between 0.1 and 5 MPa; the temperature is between 5 and 300° C., and the hourly volumetric flow rate (VVH) of the feedstock that contains the compound(s) to be hydrogenated is between 0.05 and 50 $h^{-1}$.

10. A process according to claim 1, wherein said polyunsaturated compounds are acetylenes or aromatic compounds.

11. A process according to claim 4, wherein said outside source comprises a gas from a petroleum refinery or petrochemical complex.

12. A process according to claim 11, wherein said outside source comprises a purge gas from a catalyst reforming or catalytic cracking unit.

13. A process according to claim 1, wherein said catalytically inactive hydrogen-selective membrane conforms to a tubular shape within which is said reaction zone comprising particulate catalyst.

* * * * *

UNITED STATES PATENT AND TRADEMARK OFFICE
CERTIFICATE OF CORRECTION

PATENT NO. : 7,223,894 B2  Page 1 of 1
APPLICATION NO. : 10/768176
DATED : May 29, 2007
INVENTOR(S) : Christophe Chau It is certified that error appears in the above-identified patent and that said Letters Patent is hereby corrected as shown below:

On the Title page, Inventors: line 1, reads "Christope" should read -- Christophe --
Column 12, line 8, reads "catalyst reforming" should read -- catalytic reforming --

Signed and Sealed this

Second Day of February, 2010

David J. Kappos
*Director of the United States Patent and Trademark Office*